July 8, 1969     F. S. PRESTON     3,454,944
WIDE-ANGLE INTERFEROMETER RADAR
Filed March 13, 1968
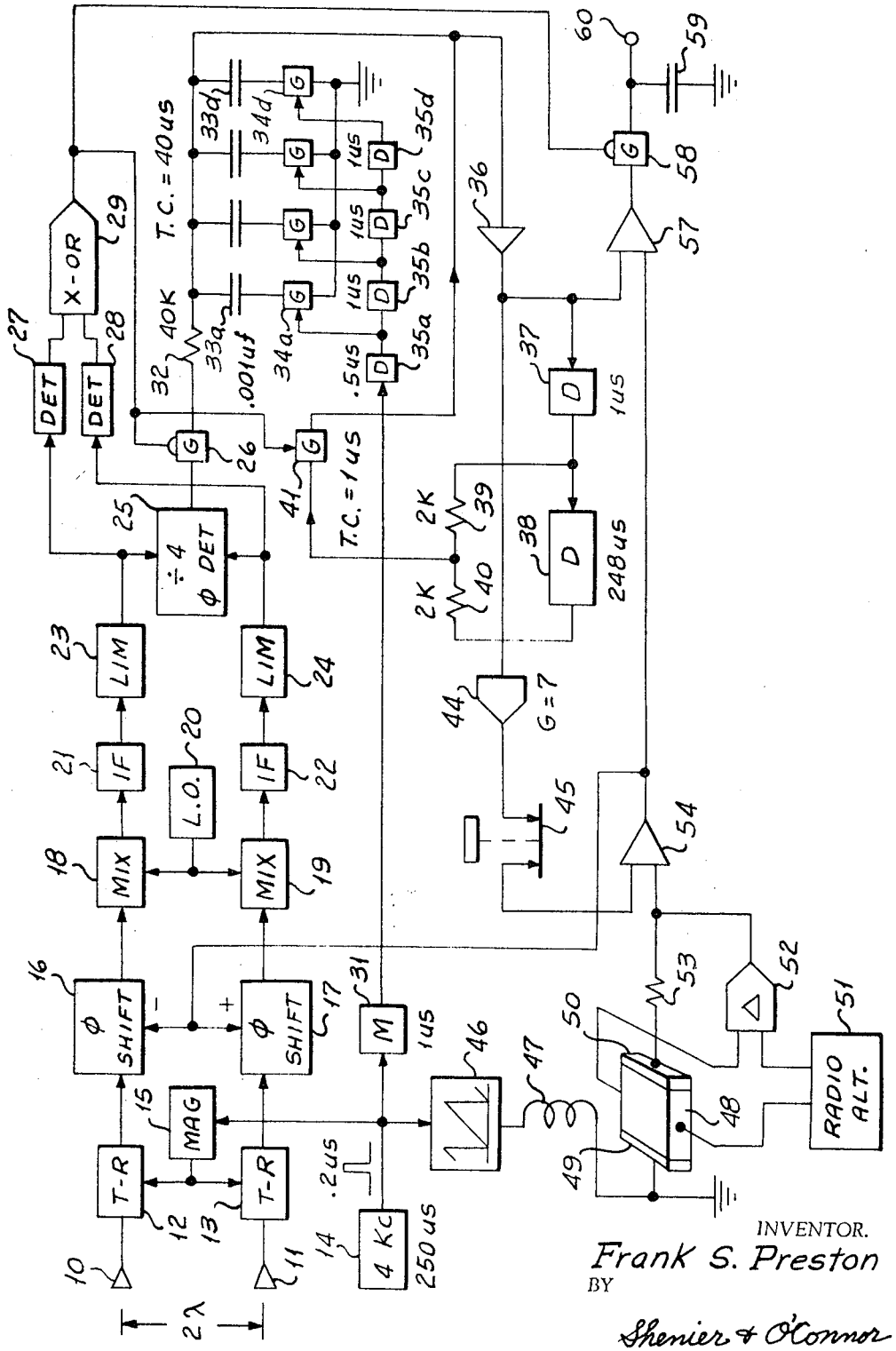
INVENTOR.
Frank S. Preston
BY
Shenier & O'Connor
ATTORNEYS United States Patent Office 3,454,944
Patented July 8, 1969

3,454,944
WIDE-ANGLE INTERFEROMETER RADAR
Frank S. Preston, Fairfield, Conn., assignor to United Aircraft Corporation, East Hartford, Conn., a corporation of Delaware
Filed Mar. 13, 1968, Ser. No. 712,685
Int. Cl. G01s 9/02
U.S. Cl. 343—16                    18 Claims

ABSTRACT OF THE DISCLOSURE

An interferometer radar system is provided with a variable phase shifting or time delay element. The phase shifter is operated in accordance with either actual or theoretically computed elevation angles of terrain. Residual phase errors are averaged by a range-gated comb filter. Relatively small amounts of negative feedback are employed to reduce the residual phase errors to less than 180°.

Background of the invention

This application is an improvement over Speller Patent 3,138,800 for Phase Detecting System. This patent shows a system having extremely high negative feedback to the phase shifter, so that the phase detector is operated substantially at a null. However, no provision is made for filtering or averaging the extremely large noise which exists in interferometer systems; and no provision is made for introducing into the system an approximation of the elevation angle of terrain. The system of the foregoing patent has not been found workable because of the strong tendency to lock in upon any one of a plurality of ambiguous nulls.

Summary of the invention

One object of my invention is to provide a wide-angle interferometer radar system in which the elevation angles of computed terrain are introduced into the phase shifter to insure operation about the desired null.

Another object of my invention is to provide a wide-angle interferometer radar system in which the output of the phase detector is applied to a range-gated comb filter to insure that noise does not shift the system to one of a plurality of improper nulls.

A further object of my invention is to provide a wide-angle interferometer radar system in which relatively small amounts of negative feedback are employed to reduce the required range of response of the phase detector and increase the region in which noise can be integrated.

Other and further objects of my invention will appear from the following description.

Brief description of the drawing

The accompanying drawing is a schematic view showing a preferred embodiment of my invention.

Description of the preferred embodiment

Referring now more particularly to the drawing, a pair of horns 10 and 11 have a vertical spacing of two wave lengths and are coupled to transmit-receive tubes 12 and 13. A free-running 4 kc. multivibrator 14 provides output pules of .2 microsecond duration with a corresponding pulse spacing of 250 µs. The output of multivibrator 14 energizes a magnetron 15 which is coupled to the transmit-receive tubes 12 and 13. The outputs of tubes 12 and 13 are coupled through respective phase shifters 16 and 17 to mixers 18 and 19. The controllable phase shifters 16 and 17 may comprise ferrite rods disposed within wave guides which are surrounded by windings producing longitudinal magnetic fields as described in Publication AD 143020 of the Armed Services Technical Information Agency, Dayton, Ohio. Mixers 18 and 19 are driven by a local oscillator 20 to provide intermediate frequencies of 30 mc. which are coupled to respective intermediate frequency amplifiers 21 and 22. The outputs of amplifiers 21 and 22 are applied to respective limiters 23 and 24, the outputs of which are coupled to a divide-by-four phase detector, the construction of which is shown in detail in co-pending application Ser. No. 655,642 filed July 24, 1967. Phase detector 25 provides substantially linear outputs corresponding to phase shifts of ±45° for inputs from limiters 23 and 24 having relative phase shifts of ±180°. The output of limiters 23 and 24 are applied to respective detectors 27 and 28 which drive an exclusive OR circuit 29. Circuit 29 provides an output only if there is a difference between the outputs of detectors 27 and 28.

The output of phase detector 25 is coupled through a normally enabled gate 26 to one terminal of a 40K input resistor 32. The other terminal of resistor 32 is connected to one plate of a plurality of capacitors 33a through 33d and to the input of a buffer amplifier 36 which may comprise an emitter follower. Each of capacitors 33 has a value of .001 µf. The other plates of capacitors 33 are connected through respective gates 34a through 34b to ground.

The output of free-running multivibrator 14 is applied to a monostable multivibrator 31 which provides output pulses of 1 µs. duration. The output of monostable multivibrator 31 is applied to a 0.5 µs. delay network 35a. The output of network 35a actuates gate 34a and is applied to 1 µs. delay network 35b. The output of network 35b actuates gate 34b and is applied to 1 µs. delay network 35c. The output of network 35c actuates gate 34c and is applied to 1 µs. delay network 35d, the output of which actuates gate 34d.

The time delay of network 35a corresponds to somewhat greater than the recovery time of the transmit-receive tubes 12 and 13. Capacitors 33, gates 34, and delay networks 35 comprise a range-gated comb filter. In practice, there should be some 249 of each of these components to store substantially all the available elevation angle information occurring during the time interval between successive transmitted pulses.

The output of unity gain buffer amplifier 36 is applied to a 1 µs. delay network 37. The output of network 37 is applied to a 248 µs. delay network 38. The outputs of networks 37 and 38 are summed through respective 2K resistors 39 and 40 and coupled through gate 41 to the input of buffer amplifier 36. Gate 41 is actuated by the output of exclusive OR circuit 29. The output of buffer amplifier 36 is further applied to one input of a summing amplifier 57 and to the input of a feedback amplifier 44 having a positive gain of seven. The output of feedback amplifier 44 is coupled through a normally closed, manually operable switch 45 to one input of a summing amplifier 54.

The system is mounted on an aircraft provided with an absolute altimeter 51, which gives the minimum distance of terrain. The output of multivibrator 14 is applied to the re-setting input of a sawtooth current generator 46. The output of generator 46 is coupled through a winding 47 to ground. Winding 47 provides a magnetic field for a Hall crystal 48 having enlarged contacts 49 and 50. The voltage output of Hall crystal 48 is serially combined with the direct current output of radio altimeter 51; and the resultant is applied to a high gain differential amplifier 52. The output of amplifier 52 is applied through a resistor 53 to current contact 50. The Hall crystal current contact 49 is grounded. The output of differential amplifier 52 is further applied to the other input of summing amplifier 54. Amplifier 54 may have unity gain and thus provide an output voltage equal to the sum of its input voltages. The output of amplifier 54 is differentially applied to the magnetic control windings of phase shifters 16 and 17 so that, for example, as the phase shift or time delay provided by 17 increases, the phase shift or time delay provided by 16 decreases. The output of amplifier 54 is also coupled to the other input of summing amplifier 57. Amplifier 57 may also have unity gain and thus provide an output voltage equal to the sum of the voltages of its inputs. The output of amplifier 57 is coupled through a normally enabled gate 58 to an output terminal 60 which is grounded through a storage capacitor 59. As will be appreciated by those skilled in the art, the horns are oscillated in azimuth to scan an appreciable section of terrain in front of the aircraft.

In operation of my invention, pulses from magnetron 15 pass through tubes 12 and 13 and are radiated from horns 10 and 11 to illuminate a substantially vertical knife-like plane subtending a small azimuth angle of, for example, 1°. Pulses more or less continuously reflected from the terrain are received by horns 10 and 11 and passed through tubes 12 and 13 and through phase shifters 16 and 17 to mixers 18 and 19. The intermediate frequency outputs of the mixers then pass through amplifiers 21 and 22 and limiters 23 and 24 to phase detector 25. The outputs of phase detector 25 are successively coupled to the capacitors 33 for 1 $\mu$s. intervals by virtue of the successive actuation of gates 34 by delay networks 35 in response to the pulse provided by multivibrator 31.

It will be subsequently shown that differential amplifier 52 provides an output corresponding to the phase shift which would be encountered if the aircraft were flying over flat terrain. If the actual terrain below the aircraft were flat, then the signal provided at the output of amplifier 52 and coupled through amplifier 54 to the phase shifters 16 and 17 would precisely compensate for the phase shift introduced by the varying elevation angles of terrain at successively increasing ranges, so that no phase shift would appear between the outputs of limiters 23 and 24. When the aircraft is flying over other than flat terrain, there will be stored in capacitors 33 a voltage profile as a function of range of the deviation in elevation angle of terrain from the flat earth computation provided by Hall crystal 48. The output of buffer amplifier 36 which represents diviations in terrain from a flat earth and the output of amplifier 54 are combined in amplifier 57 to provide at terminal 60 the profile of the actual terrain. The negative feedback provided by amplifier 44 which is coupled to summing amplifier 54 also introduces into the phase shifters a major portion of the difference between a flat earth profile and the actual terrain profile. This reduces the correction signals generated by phase detector 25 and stored in capacitors 33 by a factor of eight.

If the terrain is sufficiently rugged or the aircraft is flying at low altitudes, the terrain lying behind a mountain peak will lie in radar shadow so that continuous signals are not necessarily received by horns 10 and 11. Such discontinuities in the signal will also occur when the aircraft is flying over moderately smooth water. Depending upon the amplitude and hence the slopes of the waves on the surface of the water, negligible radar return will be received for depression angles less than, for example, 30° to 85°. In the absence of radar return due to radar shadow or to flying over water, a difference will exist between the outputs of limiters 23 and 24 since they will no longer be driven to saturation. This produces a difference in the outputs of detectors 27 and 28 which in turn produces an output from exclusive OR circuit 29. Gates 26 and 58 are disabled; and gate 41 is enabled. Storage capacitor 59 thus holds the output voltage at terminal 60 which exists at the beginning of the discontinuity in radar return. The disabling of gate 26 prevents the coupling of any further signals from phase detector 25 to the comb filtering capacitors 33.

Neglecting for the moment the action of gate 41, the successive actuation of gates 34 causes capacitors 33 to provide at the input of buffer amplifier 36 the same voltage profile which existed prior to the occurrence of the discontinuity, since the voltages stored in the various capacitors 33 will remain constant. Relative to the voltage profile provided at the output of buffer amplifier 36, the output of delay network 37 represents the voltage which occurs 1 $\mu$s. subsequently; and the output of delay network 38 represents the voltage which occurs 1 $\mu$s. previously. It will be noted that the total delay provided by networks 37 and 38 is 249 $\mu$s. which is 1 $\mu$s. less than the period between transmitted pulses, so that the output of network 38 is effectively in advance of and leads the output of buffer amplifier 36 by 1 $\mu$s. The outputs of networks 37 and 38 are summed through resistors 39 and 40 and applied through gate 41 to the comb filtering capacitors 33 during the period of discontinuity. This stores in each of the capacitors an average of the signals which occur 1 $\mu$s. subsequently and 1 $\mu$s. previously. There will thus be stored in those capacitors 33 corresponding to the range interval of the discontinuity a straight-line approximation of the endpoint elevation angles at which the discontinuity begins and terminates.

For example, assume that the aircraft is flying over mountainous terrain at an altitude of one mile, that a discontinuity due to radar shadow commences at a distance of three miles and terminates at a distance of five miles, and that the depression angle at which the discontinuity begins and ends is 9.9°. At these endpoints amplifier 52 will produce signals corresponding to respective depression angles of arc sin 1/3=19.5° and arc sin 1/5=11.5°. The respective errors from flat earth are 19.5−9.9=9.6° and 11.5−9.9=1.6° of elevation angle. Omitting from consideration for the moment the negative feedback provided by amplifier 44, gate 41 causes those capacitors 33 corresponding to ranges between three and five miles to store elevation angles representing a straight-line approximation between 9.6° and 1.6°. The purpose of this is to introduce into those filtering capacitors lying within the region of discontinuity, but adjacent the endpoints thereof, voltages closely approximating the actual elevation angle errors which will be sensed when the limits of the region change due to motion of the aircraft or scanning in azimuth. In the example given, the region of distances of the discontinuity is 5−3=2 miles. Since the total change in elevation angle error is 9.6−1.6=8°, the average slope will be 8/2=4° per mile. Thus the capacitor corresponding to a range of 3.1 miles will store an error of 9.6−.4=9.2°; and the capacitor corresponding to a range of 4.9 miles will store an error of 1.6+.4=2.0°. As the aircraft flies toward the mountain peak which causes the radar shadow, the capacitor corresponding to a range of 4.9 miles will have a stored elevation angle error which substantially agrees with the actual elevation angle error sensed when the distance to the far endpoint of the discontinuity decreases to 4.9 miles. Because of the negative feedback provided by amplifier 44, the angular error signals actually stored in the respective capacitors 33 will each be reduced by a factor of eight from the values given. Thus the respective errors from flat earth stored in the capacitors corresponding to the endpoints of the discontinuity will be $$9.6/8=1.6°$$

and $1.6/8=.2°$.

Where a discontinuity occurs because of flight over water, the flat earth signal provided by amplifier 52 will be substantially correct; and the angular errors at the endpoints of the discontinuity will be relatively small. Again gate 41 will store in those capacitors 33 corresponding to the region of discontinuity a straight-line approximation between the angular errors at the endpoints. The purpose of this is to introduce into all filtering capacitors within the region of discontinuity voltages closely approximating the actual angular errors which may be sensed due to isolated reflections caused by local surface wave interference effects or by boats and small islands. It will be appreciated that during the azimuth scan, one ore more of such singular points of reflection may appear anywhere within the region of discontinuity. In such event, gate 41 will cause capacitors 33 to store a series of straight-line approximations from the near endpoint to the first singular point, between the successive singular points (if more than one exists along an azimuth line), and from the last singular point to the endpoint.

If the horns 10 and 11 are vertically disposed, then it may be shown that (1) $\quad\quad\quad \phi = 4\pi \sin \theta$ radians where $\phi$ is the phase angle between reflected signals received by the horns and $\theta$ is the elevation or depression angle of terrain. Over a flat earth, it may be shown that (2) $\quad\quad\quad \sin \theta = H/R$ where H is the altitude and R is the slant range. Substituting Equation 2 into Equation 1 and solving for H, we obtain (3) $\quad\quad\quad H = (\phi/4\pi)R$ Hall crystal 48 provides output in accordance with the following equation where $v$ is the output voltage, $i$ is the input current, and B is the flux density. Comparing Equations 3 and 4, it will be noted that $v$ corresponds to H, $i$ may preferably correspond to $\phi$, and B may preferably correspond to R. Sawtooth generator 46 provides a linearly increasing cur- (4) $\quad\quad\quad v = iB$ rent through winding 47 corresponding to the time and hence the slant range of radar return. High gain differential amplifier 52 provides the necessary current through the Hall crystal to maintain the output voltage proportional to the aircraft altitude as measured by radio altimeter 51. Feedback resistor 53 is selected to bring the output voltage of high gain differential amplifier 52 to the proper scale factor.

Switch 45 is momentarily depressed when the aircraft is flying over relatively flat terrain such as an airport, a desert, or a body of water, or when the aircraft is flying at fairly high altitudes so that all terrain is in effect relatively flat, in order to interrupt the feedback and permit the flat-earth generator alone to supply the necessary correction signals to the phase shifters. For an antenna spacing of two wave lengths, phase detector 25 will provide correct outputs over a range of elevation angles corresponding to arc sin .25 = ±14.5°. Thus button 45 should be momentarily depressed only when the terrain differs from the flat earth approximation of Hall crystal 48 by appreciably less than 14.5°. This will insure that the system locks into operation adjacent the proper null of phase detector 25. Once the system is thus locked, no subsequent discontinuities in radar return will cause a shift to an improper null. If discontinuities occur solely due to radar shadow over mountainous terrain, then the system will remain in synchronism even if the flat earth signal from amplifier 52 is disabled. However, the flat earth signal may be needed for discontinuities due to flight over extended water areas.

For a horn spacing of two wave lengths, a phase shift of ±720° occurs between received signals at the horns for elevation angles of ±90°. Since the phase detector 25 can respond only up to phase shifts of ±180°, it is preferable that amplifier 44 have a gain of at least three. At elevation angles of ±90°, the phase shifters would subtracts 540° from the 720° phase shift at the horns, leaving 180° to be sensed by the phase detector. It will be appreciated that the phase detector would be operating at its extreme limits and would be incapable of linearly integrating any noise components which might momentarily increase the apparent phase shift at the horns appreciably above 720°. I have provided amplifier 44 with a gain of seven, so that for elevation angles of ±90°, in the absence of noise, detector 25 need not sense phase shifts greater than ±90°. Of the 720° phase shift at the horns, 630° will be subtracted in the phase shifters. This permits the effective integration of as much as 90° phase shift noise in the signals at the horns, even for elevation angles of ±90°. It will be appreciated that for relatively small elevation or depression angles, detector 25 may effectively integrate phase shift noise up to substantially ±180°.

The negative feedback provided by amplifier 44 reduces the apparent time-constant of the comb filter by a factor of eight. The apparent time constant is 40 μs. However, with switch 45 closed and the feedback path operative, the actual time constant is only 5 μs. corresponding to 5 transmitted pulses. For example, suppose that capacitor 33d stores a voltage corresponding to zero degrees error in elevation angle, but that when gate 34d is actuated, the output of phase detector 25 corresponds to 8° error in in elevation angle. During the 1 μs. interval of actuation of gate 34d, the voltage of capacitor 33d changes by an amount corresponding to 8/40=.2° of elevation angle. The voltage in capacitor 33d will exponentially approach a value corresponding to 1° of error in elevation angle. It will be seen that the time-constant of this exponential approach corresponds to 5 transmitted pulses. Although the antenna is scanning in azimuth, a relatively small azimuthal change occurs during the course of five to ten pulses, so that the filtering introduces negligible degradation in azimuth resolution. It will be appreciated that when switch 45 is opened, the time constant of the comb filter increase to its apparent value of 40 μs. However, the degradation in azimuth resolution is of no consequence, since the opening of switch 45 is only momentary in order to lock the system into operation in the region of the proper null of the phase detector.

The time-constant of the correction through gate 41 is 1 μs., since the equivalent resistance of resistors 39 and 40 in parallel is 1K. It is desired that this time-constant be relatively short, since the average outputs of delay networks 37 and 38 are smoothed values obtained from the comb filter and are relatively free of noise. Furthermore, the generation of the straight-line approximation to the endpoint elevation angle errors for the capacitors within the region of discontinuity occurs over the duration of many transmitted pulses.

The feedback gain provided by amplifier 44 should be limited to relatively small values of the order of magnitude indicated because of the adverse effects of noise in gates 34 of the comb filter. Gates 34 introduce residual off-set biases which may vary. Slow variations in bias produce only small changes from pulse to pulse. The system can track these small changes; and the only adverse effect is a shift in indicated elevation angle by the amount of change in bias. However, for a large change in bias from pulse to pulse, the system may not be able to track the change if the gain of amplifier 44 is excessive. The system may thus be shifted to an improper null. For example, assume that variation in the off-set bias of gates 34 may amount to as much as .1° of elevation angle. If this variation occurs slowly, then there is merely introduced a corresponding error in the output of amplifier 57 and hence at terminal 60. However, if this change in bias occurs suddenly between two successive pulses, then the output of amplifier 44 will suddenly jmp by an amont corresponding to .7° of elevation angle, thus producing a momentary error of .8° at output terminal 60. If the bias remains constant at the new value, then the error at output terminal 60 will exponentially decrease from .8° to .1°. If the gain of amplifier 44 is increased to 150, a sudden jump in off-set bias of .1° between successive pulses will produce a sudden change in the output of amplifier 44 corresponding to 15° elevation angle. This exceeds the range of elevation angles for which phase detector 25 provides proper outputs; and the system will be driven toward an adjacent and erroneous null. The output at terminal 60 will then be in error by nearly 29°.

I have shown a simplified embodiment of my invention in which the phase shifters or delay networks are actuated by the flat-earth approximation of Hall crystal 48. It will be appreciated by those having ordinary skill in the art that the phase shifters may instead be actuated by the profile of the actual terrain. This may be accomplished by apparatus for at least approximately measuring elevation angles of radar return. Such apparatus is shown in the aforementioned co-pending appliaction in which the magnetron output is frequency modulated and the apparent small shifts in elevation angle are synchronously detected. Further apparatus for indicating at least approximately the actual elevation angles of terrain is shown in my co-pending application for Doppler Resolution of Interferometer Ambiguities, Ser. No. 701,688 filed Jan. 30, 1968, in which the frequency shift between transmitted and received pulses is proportional to the cosine of the elevation or depresion angle measured relative to the flight path of the aircraft. When at least a rough approximation of the actual profile of terrain is provided in place of Hall crystal 48, the gain of amplifier 44 may be appreciably reduced; and, in fact, the negative feedback from the comb filter to the phase shifters may, if desired, be entirely eliminated.

It will be seen that I have accomplished the objects of my invention. I have provided a wide-angle interferometer radar system which continuously tracks terrain over a range of elevation angles which greatly exceeds the capability of the phase detector. Elevation angles of computed or actual terrain are introduced into the phase shifters to maintain operation about a proper null. A range-gated comb filter provides sufficient smoothing to insure that operation does not shift to an adjacent and improper null. Relatively small amounts of negative feedback are employed to reduce the required range of response of the phase detector and increase the extent within which noise can be integrated. During regions of signal discontinuity due to radar shadow or flight over water, the comb filtering capacitors are automatically supplied with signals approximating the characteristics of the undetectable terrain.

As previously indicated, I may employ variable time delay networks as phase shifters. These time delay networks may be inserted somewhere between the outputs of mixers 18 and 19 and the inputs of limiters 23 and 24, so as to be subject to signals of intermediate frequency. The delay networks may be digitaly controlled in steps of 180° to provide sequentially the phase shifts: −630°, −450°, −270°, −90°, +90°, +270°, +450°, and +630°. Aternatively, I may employ eight delay networks providing the foregoing phase shifts in combination with eight phase detectors. The outputs of the various phase detectors will be gated sequentially to the comb filter. For both of these alternatives, the input to the comb filter will again be maintained within the region of +90° for phase shifts of up to +720° at horns 10 and 11.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An interferometer radar system including in combination a pair of vertically spaced receiving elements, a wide-range phase detector, means including a phase shifting device for coupling the receiving elements to the phase detector, a ranged-gated comb filter providing an output, means coupling the phase detector to the comb filter, means for providing a signal varying as a function of time which at least approximates the elevation angle of terrain as a function of slant range, means responsive to the signal for controlling the phane shifting device, and means for algebraically combining the signal and the output of the filter.

2. A system as in claim 1 in which the signal providing means includes an absolute altimeter and a multiplying device.

3. A system as in claim 1 in which the signal providing means comprises a radio altimeter, a Hall crystal providing an output voltage, a sawtooth current generator, means responsive to the current generator for subjecting the crystal to a varying magnetic field, and means responsive to the output voltage and the altimeter for providing current through the crystal.

4. A system as in claim 1 which further includes means responsive to the output of the filter for controlling the phase shifting device.

5. A system as in claim 1 in which the receiving elements have a spacing of K wavelengths, the system further including amplifying means responsive to the output of the filter for controlling the phase shifting device, the amplifying means having a relatively low gain of the order of magnitude of 4K−1.

6. A system as in claim 1 which further includes means for providing negative feedback from the output of the filter to the phase shifting device, and means for selectively disabling said feedback.

7. A system as in claim 1 in which the means coupling the receiving devices to the phase detector includes a pair of limiters.

8. A system as in claim 7 which further includes means comprising an exclusive OR circuit responsive to the limiters for sensing discontinuities in radar return.

9. A system as in claim 1 in which the means coupling the phase detector to the filter comprises a gate, the system further including means operable upon a discontinuity in radar return for disabling the gate.

10. A system as in claim 1 which further includes means responsive to the output of the filter for providing a pair of signals which respectively lead and lag said output by substantially equal and relatively small time intervals, means for summing the leading and lagging signals to produce a resutlant signal, means including a gate for applying the resutlant signal to the filter, and means operable upon a discontinuity in radar return for enabling the gate.

11. A system as in claim 1 which further includes a storage element, means including a gate for coupling the algebraic combining means to the storage element, and means operable upon a discontinuity in radar return for disabling the gate.

12. A system as in claim 1 in which the wide-range phase detector divides phase shift by a factor of at least four and provides substantially linear outputs for phase shifts up to ±180°.

13. An interferometer radar system including in combination a pair of receiving elements vertically spaced by K wavelengths, a wide-range phase detector, means including a phase shifting device for coupling the receiving elements to the phase detector, a range-gated comb filter providing an output, means coupling the phase detector to the filter, amplifying means responsive to the output of the filter and having a relatively low gain of the order of magnitude of 4K−1, and means responsive to the amplifying means for controlling the phase shifting device.

14. A system as in claim 13 which further includes means for providing a signal varying as a function of time which at least approximates the elevation angle of terrain as a function of slant range, and means responsive to the signal for controlling the phase shifting device.

15. A system as in claim 13 in which the means coupling the phase detector to the filter comprises a first gate, the system further including means responsive to the output of the filter for providing a pair of signals which respectively lead and lag said output, means for summing the leading and lagging signals to provide a resultant signal, means including a second gate for applying the resultant signal to the filter, and means operable upon a discontinuity in radar return for disabling the first gate and enabling the second gate.

16. An interferometer radar system including in combination a pair of receiving elements vertically spaced by appreciably more than one-half wavelength, a range-gated comb filter, control means responsive to said elements and comprising at least one phase-shifting device and at least one wire-range phase detector for providing an input to the filter, and means comprising means actuating the control means for maintaining said input within a region corresponding to phase shifts appreciably less than ±180°.

17. A system as in claim 16 in which the actuating means comprises means for providing a signal varying as a function of time which at least approximates the elevation angle of terrain as a function of slant range.

18. A system as in claim 16 wherein the comb filter provides an output and wherein the actuating means comprises means responsive to said output.

References Cited

UNITED STATES PATENTS

| | | | |
|---|---|---|---|
| 3,181,160 | 4/1965 | Pichafroy | 343—16 X |
| 3,229,283 | 1/1966 | Hefter et al. | 343—16 X |
| 3,355,735 | 11/1969 | Chiat | 343—17.1 X |

RICHARD A. FARLEY, *Primary Examiner.*

J. P. MORRIS, *Assistant Examiner.*